United States Patent [19]

Werthaiser et al.

[11] 4,127,220

[45] Nov. 28, 1978

[54] METHOD AND APPARATUS FOR MEASURING FLUFFED DOWN BY WEIGHT

[76] Inventors: Martin S. Werthaiser, 4426 S. Fraser Ct., Denver, Colo. 80232; Paul L. Legoski, 1261 Syracuse, Denver, Colo. 80220

[21] Appl. No.: 819,886

[22] Filed: Jul. 28, 1977

[51] Int. Cl.² ............................................. G01G 13/02
[52] U.S. Cl. ........................................... 222/1; 141/83; 177/116; 222/77
[58] Field of Search ...................... 222/77; 141/83, 67, 141/68, 59, 1–12; 177/116; 53/125

[56] References Cited

U.S. PATENT DOCUMENTS 3,693,836   9/1972   Eisner ................................... 222/77

*Primary Examiner*—Houston S. Bell, Jr.
*Attorney, Agent, or Firm*—Crandell and Polumbus

[57] ABSTRACT

A method and apparatus for weighing down to provide a predetermined quantity for use in filling a garment. An amount of down is withdrawn from a supply of fluffed down maintained within a container, and is conducted into a weighing container. The weight of the down received within the weighing container is measured and the measurement signal determines the amount of down selectively withdrawn from the fluffed down container. The amount of down selectively conducted into the weighing container is controlled independently of the amount of down withdrawn from the fluffed down container. After an amount of down representing a desired weight has been conducted into the weighing container, the down is discharged from the weighing container and used to fill a garment or the like. Selectively controllable inlet and outlet doors and gates control the flow of down from the down container into the weighing container, and also control the discharge of the down from the weighing container after measurement has occurred.

29 Claims, 6 Drawing Figures

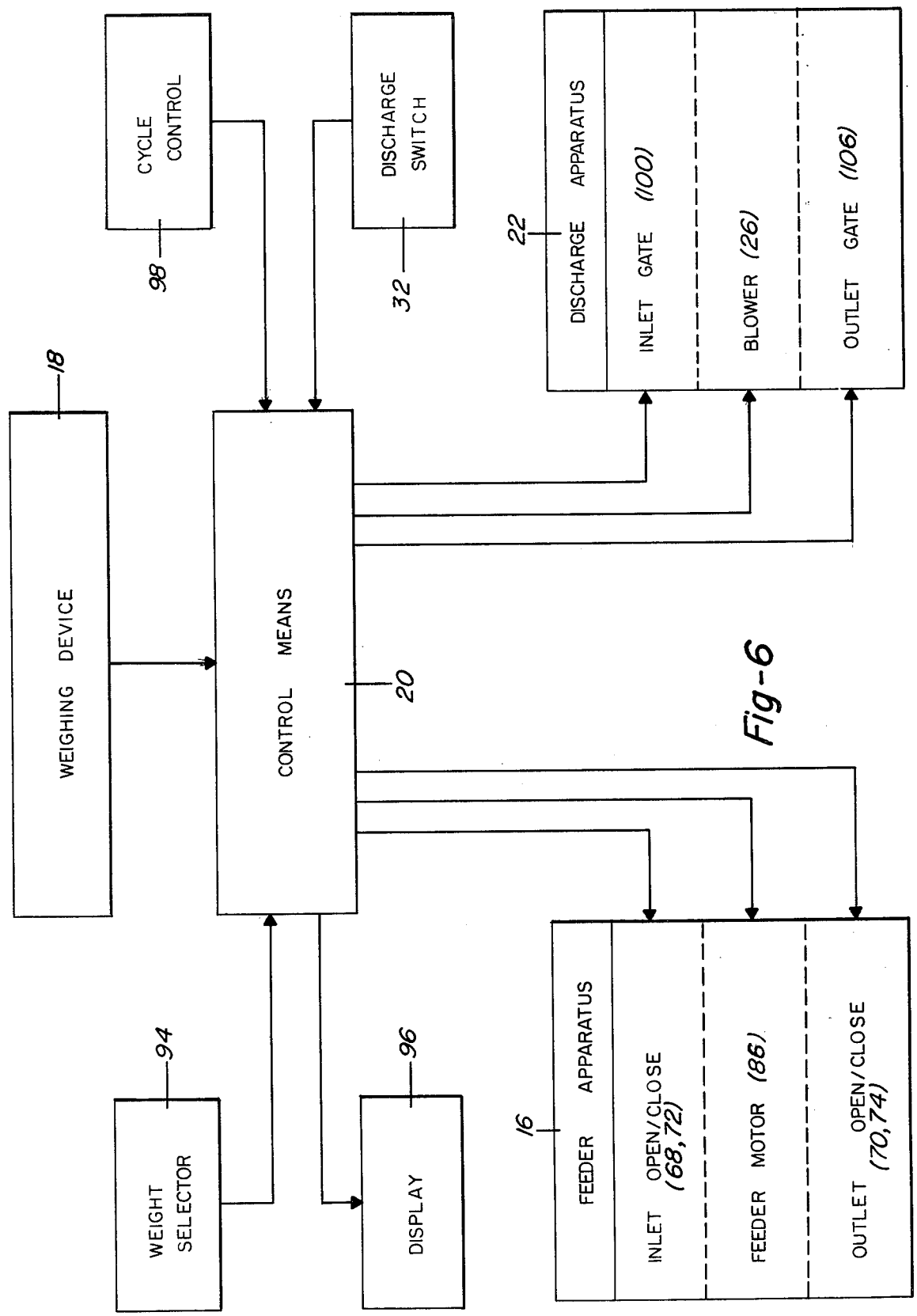

METHOD AND APPARATUS FOR MEASURING FLUFFED DOWN BY WEIGHT

BACKGROUND OF THE INVENTION

1. Field of the Invention

This invention relates to the measurement by weight of selected amounts of down typically used in filling certain garments or articles such as clothing, sleeping bags and the like.

2. Brief Description of Prior Art

Down, or the soft fine feathers from certain birds such as geese, is widely recognized for its excellent insulating characteristics, among other desirable characteristics. Because of its excellent characteristics, down is widely used in filling interior pockets formed in garments such as clothing, sleeping bags, and a wide variety of other articles. As the garments are sewn together, the various pockets formed within the interior of these articles are individually and selectively filled with down and then closed, thereby permanently containing the down within the interior of the garment. The amount of down inserted in each of the pockets is dependent upon the amount of heat insulating characteristics desired at the particular location of the pocket in the garment. A number of methods and apparatus have been devised to determine the amount of down to be inserted in each of the pockets as the garment is manufactured.

One method for determining amounts of down to be used in a garment is that of measuring the down by volume. Down is placed in a volumetric container until a desired volume is obtained. This volume is then inserted in the pocket of the garment. One significant disadvantage of determining amounts of down by volume is that the volume measured is dependent upon the degree of fluffiness or loft of the down. Even by continually fluffing the down, it is difficult to obtain consistent volumetric measurements. Due to this inaccuracy, the preferred procedure is to measure the down by weight.

Measuring down by weight presents some difficulty due to the extreme lightness of the down substance. Typically, the amount of down used to fill each of the individual garment pockets is measured in small numbers of grams or ounces. Certain prior art methods and apparatus for measuring down by weight employ balance beam scales which are counterbalanced by the desired number of gram weights equivalent to the weight of down to be inserted in the garment pocket. Down is then mechanically or manually placed in a container until the scale indicates a balanced condition, and the measured weight of down is then manually removed or mechanically suctioned from the container and inserted into the garment pocket. When this weighing procedure is accomplished manually, it is relatively time consuming, and bacause of its time consumptiveness, the operator typically will not be as accurate in measuring the down as is desired. When the weighing procedure is performed with the aid of mechanical apparatus, the mechanical apparatus does not always respond with sufficient sensitivity to obtain the desired accuracy. Furthermore, with both the manual and mechanical weighing procedures, the number of gram weights counterbalancing the scale must continually be changed since different amounts of down are inserted in different pockets.

Another method and apparatus for measuring down by weight generally involves the concept of electrically sensing down while it is suspended in a moving airstream, and thereafter correlating the sensing signals to the weight of the down suspended in the airstream. This procedure involves relatively complex control and sensing devices, and consequently, is relatively expensive.

In addition, many other disadvantages of prior art methods and apparatus for measuring down by weight are known, but as a result of the present invention, many of these prior art disadvantages can be avoided or overcome and many advantages previously unobtainable in the prior art can be achieved.

SUMMARY OF THE INVENTION

Objectives of the present invention are to provide a new and improved method and apparatus for measuring quantities of down by weight, which obtains the desirable characteristics of accurate and reliable weight measurement on an individual and repetitious basis, reduction or elimination of operator error in measuring the down, relatively rapid measurement and discharge of the down to decrease the time interval between individual measurements, a high degree of automation and control over the down from the time it is removed from bales or bundles until the time it is inserted into the garment pockets, and accurate and reliable performance from a relatively low cost machine.

In accordance with the present invention, the method and apparatus for measuring selected amounts of down by weight generally involves continuously fluffing a supply of down, withdrawing a selected amount of down from the continuously fluffed supply, conducting a selected amount of the withdrawn down into a weighing container, and sensing the weight of the down received within the weighing container. Signals indicative of the weight of down in the weighing container control the amount of down withdrawn from the continuously fluffed supply, and also control the amount of withdrawn down which is then conducted into the weighing container. After the desired weight of down has been conducted into the weighing container, the measured amount is discharged for use. The supply of down is contained within a main container wherein it is continuously fluffed and lofted and generally moved in a rapidly flowing stream. The down withdrawn from the main container is withdrawn at a lesser flow rate, and the down conducted into the weighing container is conducted at even a lesser rate than that at which it is withdrawn in order to attain high resolution and accuracy in the amount and weight measured. Inlet and outlet doors and gate means control the amount of down withdrawn from the supply of continuously fluffed down, conducted into the weighing container, and then discharged from the weighing container. A sensitive, electronic variable capacitance measuring device senses the weight of down received in the weighing container.

BRIEF DESCRIPTION OF THE DRAWINGS

FIG. 6 is a block diagram schematically illustrating one control arrangement for the apparatus of the present invention.

DESCRIPTION OF THE PREFERRED EMBODIMENT

Figure 1:
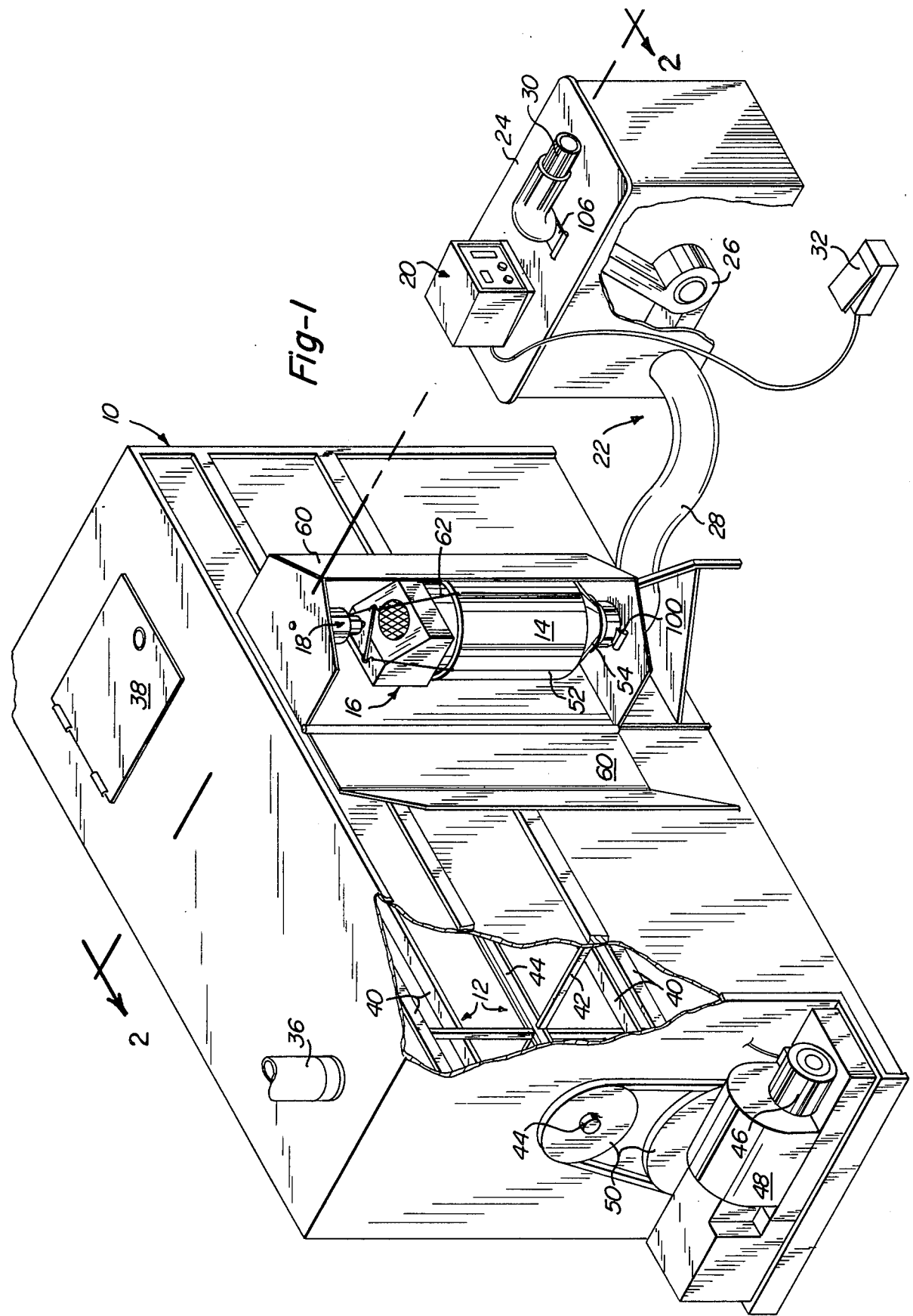
FIG. 1 is a perspective view of a preferred embodiment of apparatus according to the present invention, with certain portions broken away for clarity.

The apparatus embodying the present invention as shown in FIG. 1 generally comprises a main hopper 10 into which a supply of down (not shown) is introduced. A paddle wheel 12 is rotatably mounted in the main hopper and rotates to continuously fluff and loft the down within the main hopper 10. Adjacent to the hopper there is provided a weighing container 14 which receives down to be measured and weighed. A feeder mechanism 16 selectively withdraws an amount of down from the main hopper 10 and feeds the selected amount of the down into the weighing container 14. A weighing device 18 senses the weight of the down in the weighing container 14 and provides a signal representative of the weight of down. Control means 20 is provided to operatively control the selective removal and conduction of down from the main hopper 10 into the weighing container 14 in accordance with the weight sensed by the weighing device 18 and the desired weight of down to be obtained. Discharge apparatus 22, including a blowing table 24, a blower 26 and a conduit 28, discharges the measured weight of down within the container 14 through a nozzle 30 into the pocket of a garment (not shown) to be filled with the down. The discharge apparatus is activated by a foot operated discharge switch 32 actuated by the machine operator.

Figure 2:
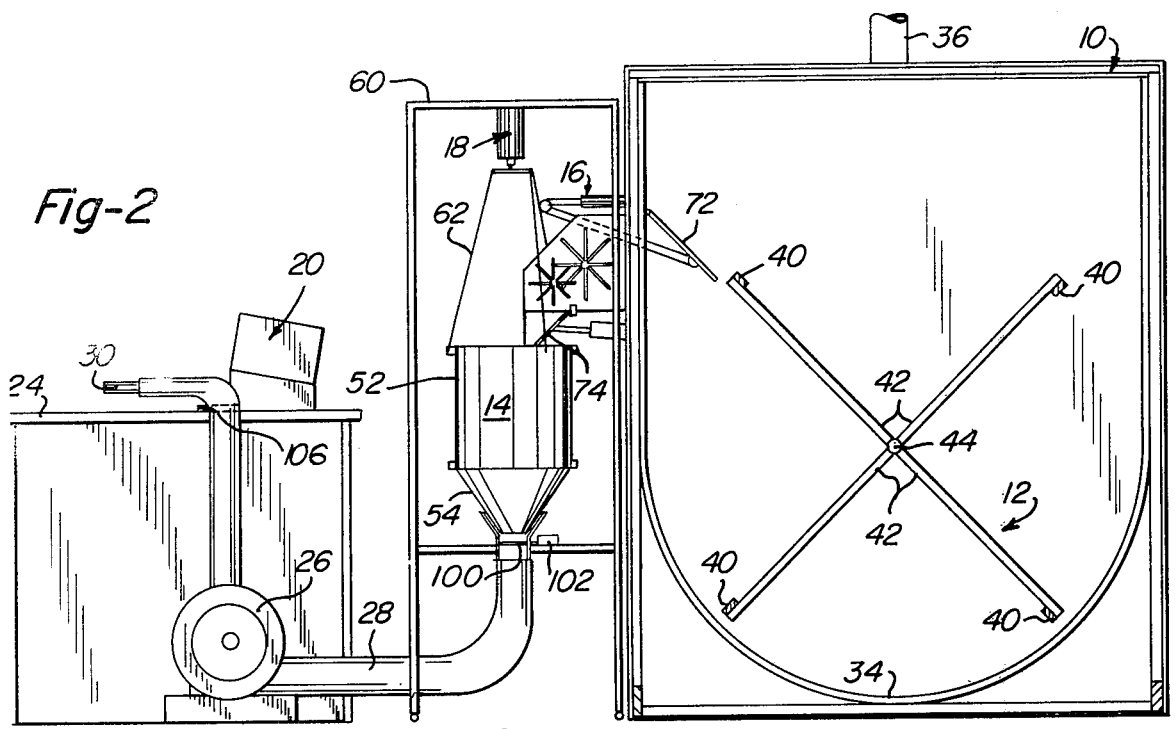
FIG. 2 is a vertical section view taken substantially in the plane of line 2—2 of FIG. 1, and with certain parts foreshortened for convenience in illustration.

The main hopper 10 contains a supply of down. This hopper 10, as shown in FIGS. 1 and 2, is formed as a generally rectangular box with a cylindrically curved bottom interior wall 34. For filling the hopper, a door (not shown) is provided in one end wall of the hopper at a position slightly above the lowermost curve of the bottom wall 34. Introduction of down into the hopper 10 is accomplished by an air suction pump (not shown) which is attached to a duct 36 opening into the top wall of the main hopper. With suction applied at the duct 36, the down from bags, bales or shipping containers is pulled by suction into the hollow interior of the main hopper 10, thereby filling the main hopper with a desired amount of down. A hatch 38 is provided in the top wall of the main hopper to allow an individual to enter the interior of the main hopper for servicing or maintenance if necessary.

The paddle wheel member 12, which serves as means for continuously fluffing and lofting the supply of down contained within the main hopper 10, is best shown in FIGS. 1 and 2. The paddle wheel member 12 comprises four paddle blades 40, each of which is attached at the outermost radial end of arm members 42 extending from a center shaft 44. The center shaft 44 is rotatably supported by the end walls of the main hopper 10 allowing the paddle blades 40 of the paddle wheel member 12 to rotate in close juxtaposition to the cylindrically curved bottom wall 34 of the main hopper. The paddle wheel member 12 is continuously rotated by an operating electric motor 46 connected to a gear box drive 48 which supplies motive power through a belt and pulley arrangement 50 to the center shaft 44. As the paddle wheel member 12 rotates within the interior of the main hopper 10 a flow of fluffed and lofted down is created generally along the path traversed by the paddle blades.

The weighing container 14, which serves to receive an amount of down to be weighed, is shown in FIGS. 1 to 5. The weighing container 14 includes an upper cylindrically shaped portion 52 and a lower frustroconically shaped portion 54. A relatively wide opening or mouth 56 (FIG. 4) is provided at the upper end of the cylindrically shaped portion 52 and a relatively small removal opening 58 (FIG. 5) is formed in the lower end of the frustroconically shaped portion 54. The down received within the weighing container falls to the small end of the frustroconical shaped portion 54 and bridges the relatively small removal opening 58 formed therein. Because of this bridging effect, there is little or no significant adverse weighing effect from the relatively small amount of down at the removal opening 58 which is not supported by the container 14. The weighing container 14 is preferably formed of a relatively light but rigid material such as styrofoam.

Figure 3:
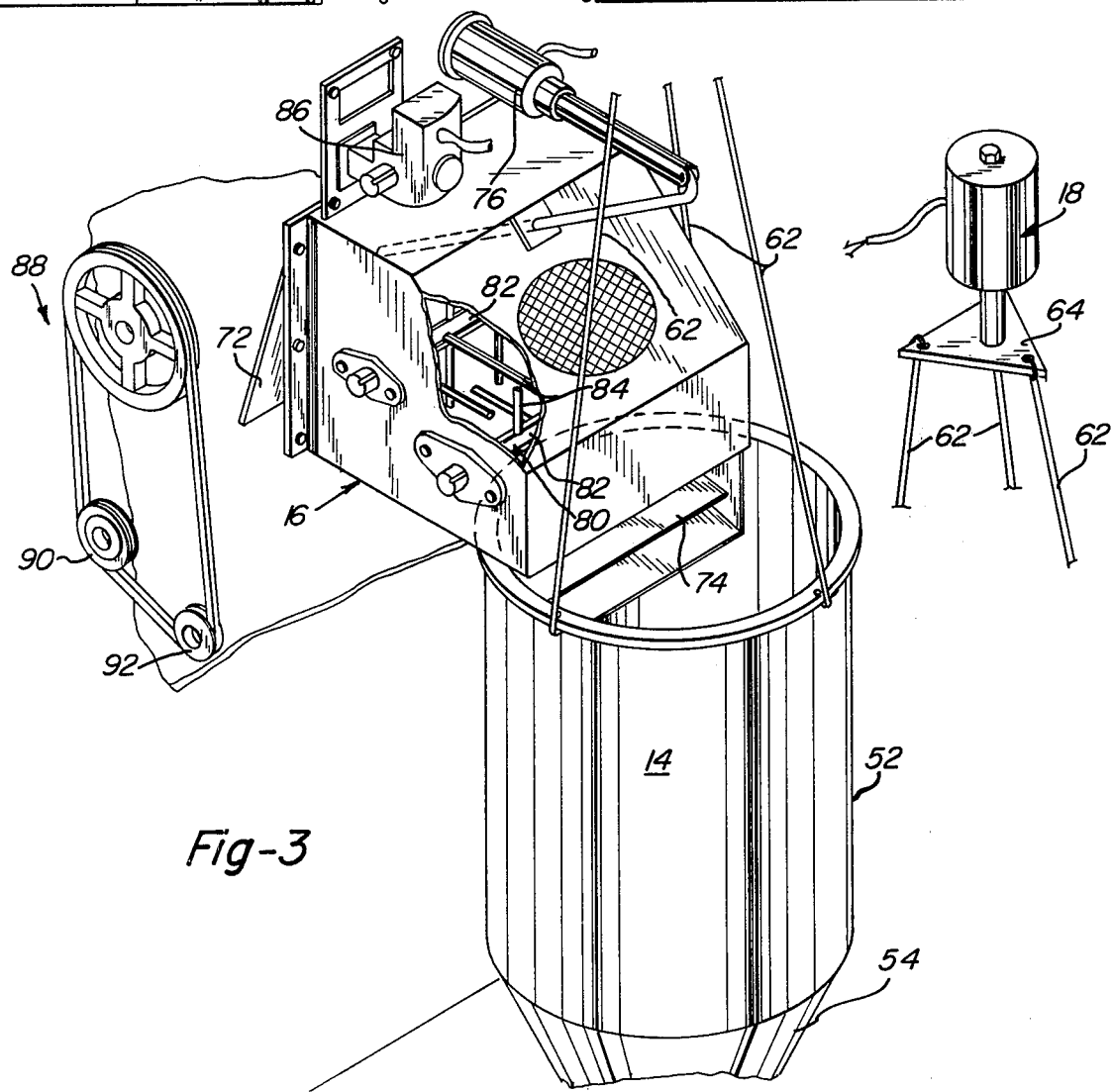
FIG. 3 is a perspective view of a feeder box apparatus and weighing container comprising a portion of the apparatus of the present invention, with certain portions broken out and certain elements spaced from their operative portions for the purposes of clarity.

The weighing device 18 is attached to the upper wall of an enclosure 60 attached to the outer portion of the main hopper 10 as is shown in FIGS. 1 and 2. In order to obtain an accurate weight measurement, the weighing container 14 is suspended from the weighing device 18 within the enclosure 60 in a manner such that it is essentially free of interference from adjacent structures. As shown in FIG. 3, cables 62 are attached to a triangular plate 64 which are connected to suspend the weighing container 14 from weighing device. The weighing device 18 is a conventional electronic variable capacitance weighing device, such as Model 202-002 manufactured by Scientech, Inc. of Boulder, Colo. Signals from the weighing device 18 are supplied to the control means 20 to control the feeder mechanism or apparatus 16.

Figure 4:
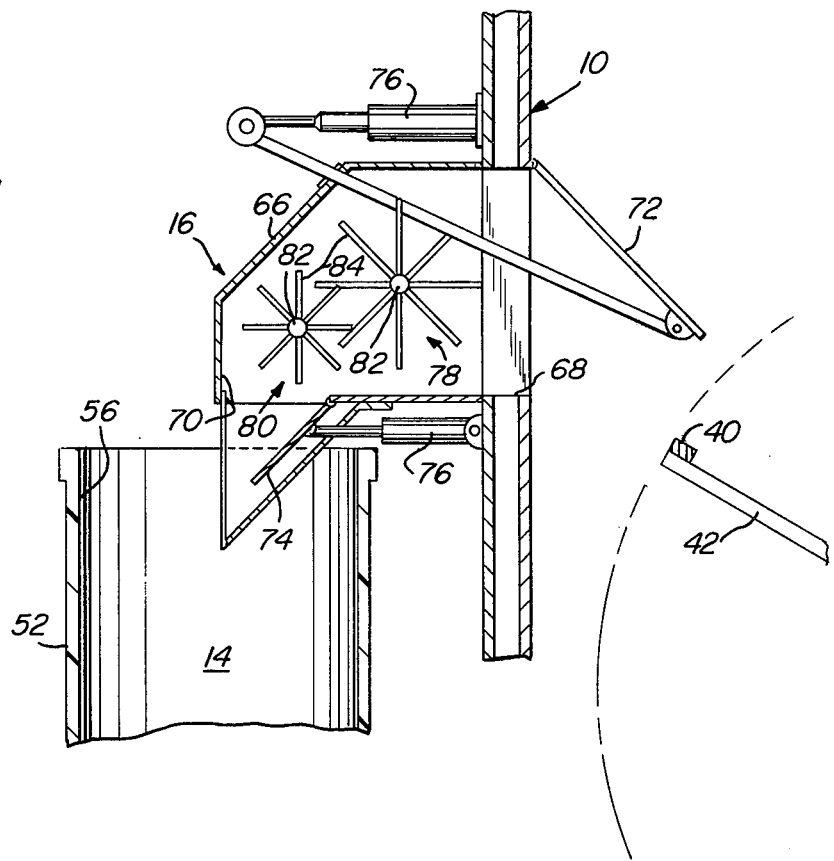
FIG. 4 is an enlarged view of the feeder mechanism shown in FIG. 2.

The feeder apparatus 16, shown best in FIGS. 2, 3 and 4, selectively withdraws an amount of fluffed down from the main hopper 10 and selectively conducts an amount of the withdrawn down into the weighing container 14, in accordance with the control signals supplied by the control means 20. The feeder apparatus 16 shown in FIG. 4 comprises a feeder box housing 66 having an inlet opening 68 and an outlet opening 70. An inlet door 72 opens and closes the inlet opening 68, and an outlet door 74 opens and closes the outlet opening 70. Conventional pneumatic piston devices 76 control the opening and closing of the inlet and outlet doors under control from the control means 20. Inlet door 72 opens into the flow stream of fluffed and lofted down within the main hopper 10 directs a portion of the flow of down into the interior of the feeder box housing 66. Pronged members 78 and 80 rotate within the interior of the feeder box housing to move the down through the feeder apparatus 16 from the inlet opening 68 to the output opening 70. The pronged members 78 and 80 each comprise a center axle shaft 82 having a plurality of fingers 84 extending radially outward therefrom. The pronged members 78 and 80 are rotated at different speeds by an electric motor 86 connected to the shaft 82 by a belt and pulley arrangement 88, shown in FIG. 3, due to the different sized pulleys 90 and 92 of the pulley and belt arrangement. The length of the fingers 84 of the pronged member 78 is greater than the length of the fingers of the pronged member 80. To prevent the down from clogging the pronged members 78 and 80, the axial positions of the prongs 84 on the axle shafts 82 of the pronged members 78 and 80 are such that the fingers 84 rotate past one another in an overlapping and non-contacting relationship so that down is continuously cleaned from the rotating members 78 and 80.

The rotating pronged members 78 and 80 move and feed the fluffed down between the inlet 68 and the outlet 70 of the feeder apparatus. Although the pronged member 78 rotates more slowly than the pronged member 80, the length of the fingers extending from pronged member 78 is greater than the length of the fingers extending from the pronged member 80, thereby causing the flow of down through the feeder apparatus 16 to decrease in flow rate from pronged member 78 to pronged member 80, and hence between the inlet opening 68 and the outlet opening 70. The rate at which the fluffed down is drawn into the feeder apparatus 16 by the pronged member 78 is less than the rate or flow of down within the main hopper 10 created by the rotating paddle wheel 12. By progressively slowing the rate of flow of down from the main hopper 10 through the outlet opening 70 of the feeder apparatus 16, a finer resolution of the amount of down conducted into the weighing container 14 is obtained, thereby securing a relatively high degree of accuracy in weighing the amount of down conducted into the weighing container.

The control means 20 includes conventional electronic circuitry arranged to provide the control functions described herein and illustrated schematically in FIG. 6. The control means 20 includes a weight selector 94 which allows the operator to select the desired weight in grams of an amount of down to be weighed and subsequently inserted into a particular garment pocket. The weight selected is shown on a digital readout of a display 96 for viewing by the operator. Signals received by the control means 20 from the weighing device 18 are compared within the control means to the signals representative of the weight selected at the weight selector 94 to control the measuring and weighing. A cycle control 98 allows the operator to initiate the cycle of measuring and weighing a selected amount of down and discharging the measured amount of down for use.

Upon activation of the cycle control 98, the control means supplies electrical signals to activate air solenoids (not shown) for operating the pneumatic piston devices 76 shown in FIG. 4. The inlet door 72 and outlet door 74 open simultaneously and a flow of down is moved through the feeder apparatus 16. When approximately 90 percent of the desired weight of down to be measured is received within a weighing container 14, as sensed by the weighing device 18, the control means 20 operatively closes the inlet door 72. The down contained within the feeder box housing 66 continues to be moved through the outlet opening 70 until approximately 98 to 100 percent of the desired weight is sensed within the weighing container 14, at which point the control means 20 operatively closes the outlet door 74 thus terminating the conduction of down into the weighing container. It is apparent that the amount of down withdrawn from the main hopper through the opening 68 and door 72 is controlled independently of the amount of down conducted into the weighing container through opening 70 and door 74.

Figure 5:
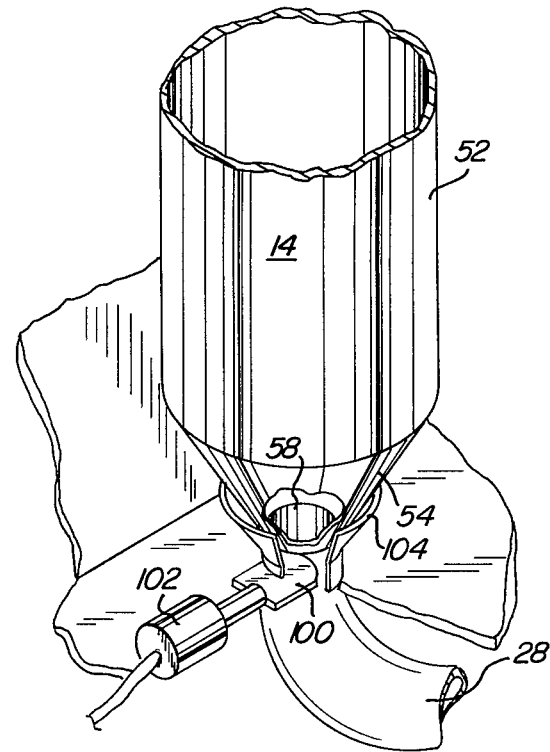
FIG. 5 is an enlarged view of the weighing container and a portion of the discharge apparatus shown in FIG. 1.

The discharge apparatus 22 is shown in detail in FIGS. 1, 2 and 5. After the desired amount of down has been conducted into the weighing container 14, an inlet gate means 100 of the conduit 28 is opened by a pneumatic piston device 102 controlled by air solenoids (not shown) operated by signals from the control means 20 in accordance with the activation by the operator of the discharge switch 32. A funnel device 104 surrounds the lower portion of the frustroconically shaped portion 54 of the weighing container 14 to center the removal opening 58 of the weighing container above the inlet of the conduit 28. Simultaneously with the opening of the inlet gate 100, an outlet gate 106 of the discharge apparatus 22 is opened. The outlet gate 106 is opened by a pneumatic piston device controlled air solenoids (not shown) operated by signals from the control means 20. In addition to the simultaneous opening of the input gate 100 and output gate 106, the blower 26 is started to remove the measured amount of down received within the weighing container by suction and to convey that down, while suspended in air, through the blower 26, through the outlet gate 106 and nozzle 30 and into the garment pocket to be filled with down. When all of the down has been discharged from the weighing container 14 into the pocket of the garment, the operator releases the discharge switch 32 which simultaneously closes the inlet and outlet gates 100 and 106 and stops operation of the blower 26. The outlet gate 106 prevents unnecessary flow of air into the pocket of the garment after it has been filled as a result of the free wheeling blower 26, thereby avoiding the possibility that this air movement will blow some of the down out of the garment pocket. Signals from the weighing device 18 supplied to the control means 20 indicate the complete discharge of all of the measured amount of down within the weighing container 14. This signal causes the display 96 to indicate to the operator that the discharge switch 32 may be released.

The control means 20 can be arranged to prevent operation if a jam-up or malfunction is sensed. If, for example, all of the down has not been completely discharged from the weighing container, the weighing device will sense the remaining weight and prevent initiation of the next weighing cycle. If a jam-up occurs prior to the point at which down is conducted into the weighing container, the absence of signals representing increasing weight indicate that a jam-up has occured and further operation is ceased.

A summary of the operation of the apparatus previously described and a description of the method of the present invention can be best understood by reference to FIGS. 1, 2 and 6. A supply of down is loaded into and contained by the main hopper 10. The continuously rotating paddle wheel member 12 continuously fluffs the down within the main hopper. The operator selects a desired weight of down to be measured by manipulating the weight selector 94 of the control means 20. Activation of the cycle control 98 of the control means simultaneously opens the inlet and outlet doors of the feeder apparatus 16. Down is moved into the inlet of the feeder apparatus from the flow of down within the main hopper. As the down moves through the feeder apparatus 16 its rate of flow decreases, and the down is conveyed out of the feeder apparatus into the weighing container 14. The weight of the down received in the weighing container is sensed by the weighing device 18 which applies signals to the control means 20. When approximately 90 percent of the desired weight of down has been received in the weighing container the control means operatively causes the inlet door 72 of the feeder apparatus 16 to close, thereby terminating the selective withdrawal of down from the main hopper. The down within the feeder apparatus 16 is thereafter conveyed out of the outlet opening until approximately 98 to 100 percent of the desired weight is measured by the weighing device, at which point the control means 20 operatively closes the outlet door 74 of the feeding apparatus 16. The operator activates the discharge switch 32 which simultaneously opens the discharge inlet gate 100 and discharge outlet gate 106 and activates the blower 26. Suction by the blower 26 removes the measured down from the weighing container and blows the down through the nozzle 30 into the pocket of the garment which is thereby filled with the selected quantity of down. Upon release of the discharge switch 32, the inlet and outlet gates 100 and 106 close and the blower 26 is deactivated. The apparatus is then ready to begin another cycle to measure another amount of down selected by the operator.

By the present invention, a high degree of accuracy and reliability of measurement is obtained. The operation is essentially fully automated from the time the down is received within the main hopper until it is discharged into the pocket of the garment, thereby allowing for relatively quick weighing of accurate amounts of down. Since the movement and flow of down within the apparatus described is essentially contained within various housings and enclosures from the point at which the down is introduced into the main hopper to the point at which the measured amount of down is blown into the pocket of the garment, the escape of down into the surrounding environment is held to a minimum. The arrangement of feeder apparatus elements avoids jamming or clogging of the down. The apparatus of the present invention can be constructed with readily available components. In general, the present invention provides highly accurate measurements in relatively short periods of time from an apparatus which is relatively inexpensive.

Although the present invention has been described with a certain degree of particularity, it is understood that the present disclosure has been made by way of example and that changes and details of structure may be made without departing from the spirit and scope of the invention as expressed in the appended claims.

We claim as our invention:

1. Apparatus for measuring selected amounts of down by weight and for supplying the measured down for use, comprising:
    means for containing a supply of down,
    means for continuously fluffing the down contained within said containing means,
    weighing container means for receiving down to be weighed,
    feeding means for selectively withdrawing an amount of fluffed down from said containing means and for selectively conducting an amount of the withdrawn down into said weighing container means,
    means for sensing the weight of fluffed down conducted into said weighing container means, and
    control means, operatively connected with said feeding means and said weight sensing means, for receiving signals from said weight sensing means indicative of the weight of down received within said weighing container means, and for controlling the amount of fluffed down withdrawn from said containing means in accordance with the signals received, and for controlling the amount of down conducted into said weighing container means in accordance with the signals received.

2. Apparatus as recited in claim 1 wherein the amount of fluffed down selectively withdrawn by said feeding means is independent of the amount of down conducted to said weighing container means.

3. Apparatus as recited in claim 2 wherein said feeding means comprises:
    inlet means for selectively opening to withdraw the fluffed down from said containing means,
    outlet means for selectively closing to terminate the conduction of down to said weighing container means, and
    means for controlling said inlet means independently of said outlet means.

4. Apparatus as recited in claim 3 wherein said means for continuously fluffing the down also creates a flow of down within said containing means, and said inlet means opens into the flow of down.

5. Apparatus as recited in claim 3 wherein said feeding means further includes means for moving the fluffed down between the inlet means and the outlet means and means for moving the fluffed down out of the outlet means at a lesser rate than the fluffed down is moved into the inlet means.

6. Apparatus as recited in claim 5 wherein the rate of flow of the fluffed down created by said means for continuously fluffing the down within said containing means is different than the rate of movement of the down through said feeding means.

7. Apparatus as recited in claim 1 further comprising:
    suspension means for suspending said weighing container means essentially free from interference from other objects, whereby the weight of down received therein can be accurately determined.

8. Apparatus as recited in claim 7 wherein said suspension means is operatively connected with said weight sensing means.

9. Apparatus as recited in claim 1 wherein said feeding means comprises:
    inlet means for opening to withdraw fluffed down from said containing means and for selectively closing to terminate the withdrawal of down from said containing means,
    outlet means for opening to allow the conduction of down into said weighing container means and for selectively closing to terminate the conduction of down into said weighing container means, and
    wherein said control means operatively controls the inlet and outlet means of said feeding means independently of one another.

10. Apparatus as recited in claim 9 wherein said control means controls the inlet means and the outlet means of said feeding means essentially in the following manner:
    opens the inlet means and the outlet means approximately simultaneously,
    closes the inlet means when signals from said weight sensing means indicate less than the desired weight of down is received within said weighing container means, and
    closes the outlet means when signals from said weight sensing means indicate that the weight of down contained within said weighing container means is within the range of weights greater than the weight upon which said inlet means is closed and no greater than the weight desired to be measured.

11. Apparatus as recited in claim 10 wherein:

the inlet means is closed at approximately 90 percent of the desired weight, and the outlet means is closed at a weight in the range of 98 to 100 percent of the desired weight.

12. Apparatus as recited in claim 1 wherein said control means includes means for selecting the desired amount of weight to be measured.

13. Apparatus as recited in claim 1 further comprising:

discharge means for discharging substantially all of the down from said weighing container means after substantially all of the down conducted by said feeding means has been received in said weighing container means.

14. Apparatus as recited in claim 13 wherein said weighing container means includes a down removal opening, and said discharge means comprise inlet gate means operatively positioned to control the removal of down from said weighing container means by opening and closing the down removal opening.

15. Apparatus as recited in claim 14 wherein the inlet gate means of said dicharge means is operatively controlled by said control means to open the removal opening subsequent in time after the desired weight of fluffed down has been received in said weighing container means.

16. Apparatus as recited in claim 15 wherein said discharge means further comprises:

inlet gate means operatively controlled by said control means for opening and closing, outlet gate means operatively controlled by said control means for opening and closing, conduit means interconnecting the inlet and outlet gate means, and blower means within said conduit means for suctioning down through the inlet means and blowing the down through the outlet means when the gate means are open.

17. Apparatus as recited in claim 1 wherein:

said containing means comprises a main hopper having a curved wall portion, and said means for continuously fluffing the down comprises a paddle member mounted for movement adjacent at least a portion of the curved wall portion of said main hopper.

18. Apparatus as recited in claim 1 wherein said weighing container means comprises a container including a frustroconically shaped portion and a removal opening positioned at the small end of the frustroconically shaped portion.

19. Apparatus as recited in claim 1 wherein said feeding means comprises:

a feeder box housing, an input opening communicating with said feeder box housing, an output opening communicating with said feeder box housing, and at least one pronged member mounted for rotation within said feeder box housing.

20. Apparatus as recited in claim 19 wherein each said pronged member comprises an axle shaft with a plurality of fingers extending radially therefrom.

21. Apparatus as recited in claim 1 wherein said weight sensing means comprises a variable capacitance weighing device.

22. Apparatus for measuring selected amounts of down by weight and for supplying the measured down for use, comprising:

containing means for containing a supply of down, means for continuously fluffing the down contained within said containing means, weighing container means for receiving down to be weighed, feeding means for selectively withdrawing an amount of fluffed down from said containing means and for selectively conducting an amount of the withdrawn down into said weighing container means, weight measurement means for sensing the weight of fluffed down conducted into said weighing container means, and discharge means for discharging substantially all of the down from said weighing container means after substantially all of the down conducted by said feeding means has been received in said weighing container means.

23. A method of measuring down by weight for use, comprising the steps of:

continuously fluffing a supply of down within a main container, withdrawing an amount of fluffed down from the main container, selectively conducting an amount of the withdrawn down into a weighing container, sensing the weight of the down in the weighing container, controlling the amount of fluffed down withdrawn from the main container in relation to the weight sensed, and controlling the amount of down conducted into the weighing container in relation to the weight sensed and independently of the amount of down withdrawn from the main container.

24. A method as recited in claim 23 further comprising the step of:

discharging all of the down from the weighing container after substantially all of the down conducted into the weighing container has been received therein.

25. A method as recited in claim 24 wherein the step of discharging all of the down from the weighing container is achieved by suctioning the down from the weighing container.

26. A method as recited in claim 23 further comprising the steps of:

establishing a flow of fluffed down within the main container, and establishing an essentially continuous flow of the down conducted into the weighing container from the main container into the weighing container.

27. A method as recited in claim 26 further comprising the step of progressively slowing the rate of flow of the down conducted into the weighing container from the flow rate in the main container to the flow rate at which the down is initially conducted into the weighing container.

28. A method as recited in claim 26 wherein the rate of flow of the down withdrawn is less than the rate of flow of down within the main container and greater than the rate of flow of down initially conducted into the weighing container.

29. A method as recited in claim 23 further comprising the steps of:

suspending the weighing container, and sensing the weight of the down in the weighing container while said weighing container is suspended.

* * * * *